United States Patent
Morris

(10) Patent No.: US 9,986,865 B2
(45) Date of Patent: Jun. 5, 2018

(54) RETROFITTABLE SYSTEM AND APPARATUS FOR HANGING ARTICLES ON PRE-INSTALLED SUPPORTS

(71) Applicant: Christopher Morris, Los Angeles, CA (US)

(72) Inventor: Christopher Morris, Los Angeles, CA (US)

( * ) Notice: Subject to any disclaimer, the term of this patent is extended or adjusted under 35 U.S.C. 154(b) by 0 days. days.

(21) Appl. No.: 15/269,857

(22) Filed: Sep. 19, 2016

(65) Prior Publication Data
US 2018/0078073 A1    Mar. 22, 2018

(51) Int. Cl.
| | | |
|---|---|---|
| A47H 1/10 | (2006.01) | |
| A47H 1/00 | (2006.01) | |
| A47H 1/102 | (2006.01) | |
| A47H 1/12 | (2006.01) | |
| A47H 1/18 | (2006.01) | |
| F16M 13/02 | (2006.01) | |
| F16B 2/22 | (2006.01) | |
| F16B 2/08 | (2006.01) | |

(52) U.S. Cl.
CPC ............... *A47H 1/00* (2013.01); *A47H 1/102* (2013.01); *A47H 1/12* (2013.01); *A47H 1/18* (2013.01); *F16B 2/08* (2013.01); *F16B 2/22* (2013.01); *F16M 13/022* (2013.01)

(58) Field of Classification Search
CPC ............. Y10T 24/3449; Y10T 24/3439; Y10T 24/3443; Y10T 24/3447
USPC ........ 248/690, 692, 73, 74.4, 251, 261, 262, 248/265, 304, 307, 316.7, 339; 160/368.1
See application file for complete search history.

(56) References Cited

U.S. PATENT DOCUMENTS

| | | | | |
|---|---|---|---|---|
| 1,119,695 A | * | 12/1914 | Hatch | A47H 1/122 248/261 |
| 1,310,295 A | * | 7/1919 | Robillard | F16D 55/2245 188/205 R |
| 2,147,625 A | * | 2/1939 | Brothers | A47G 25/746 16/87.4 R |
| 3,104,086 A | * | 9/1963 | Salzmann | A47H 1/122 160/345 |
| 4,120,474 A | * | 10/1978 | Hurley | A47H 1/124 16/93 D |
| 4,181,279 A | * | 1/1980 | Perrault | F16L 3/00 248/222.51 |
| 4,226,394 A | * | 10/1980 | Einhorn | A47J 47/16 24/716 |

(Continued)

*Primary Examiner* — Terrell L McKinnon
*Assistant Examiner* — Michael McDuffie
(74) *Attorney, Agent, or Firm* — Omni Legal Group; Omid E. Khalifeh

(57) ABSTRACT

Systems and apparatuses for hanging articles while avoiding removal and/or damage to pre-installed supports and even surfaces are provided. In an embodiment, a device comprises a body configured to mechanically rest on or grip a portion of the pre-installed support, or even to be forcibly strapped to the pre-installed support. Additionally, a linking member, such as a clip, groove, channel, or hook, may be disposed along the body to join an article to the support. In practice, a plurality of devices may be applied to a variety of different types of head rails and other supports to join, for example, curtains to the head rail or other support, whether by forcibly gripping such curtains or supportively receiving a rod fitted with curtains.

14 Claims, 5 Drawing Sheets

(56) References Cited

U.S. PATENT DOCUMENTS

| | | | | |
|---|---|---|---|---|
| 4,709,888 A * | 12/1987 | Cubit | ............ | F16L 3/221 248/68.1 |
| 4,817,910 A * | 4/1989 | Molnar | ............ | H04Q 1/06 248/68.1 |
| 6,145,677 A * | 11/2000 | Corniel | ............ | D06F 95/00 211/105.1 |
| 6,543,737 B2 * | 4/2003 | Decker | ............ | A47K 10/185 248/316.1 |
| 6,598,843 B1 * | 7/2003 | Bell | ............ | A47H 1/14 248/251 |
| 7,360,746 B2 * | 4/2008 | Routhier | ............ | F16B 5/0685 248/250 |
| 7,520,476 B2 * | 4/2009 | Caveney | ............ | H02G 3/0456 248/59 |
| 7,648,111 B2 * | 1/2010 | Goldstein | ............ | A47H 1/022 248/200.1 |
| 7,819,365 B2 * | 10/2010 | Elsner | ............ | F16L 3/233 24/16 PB |
| 8,757,570 B2 * | 6/2014 | Ernst | ............ | A47G 25/0607 248/223.41 |
| 8,814,112 B2 * | 8/2014 | Thompson | ............ | A47G 1/175 248/205.3 |
| 8,840,071 B2 * | 9/2014 | Oh | ............ | F16L 3/1075 248/58 |
| 2003/0221794 A1 * | 12/2003 | Morris | ............ | A47H 2/00 160/38 |
| 2004/0195484 A1 * | 10/2004 | Sheeran | ............ | A47G 29/083 248/304 |
| 2005/0067544 A1 * | 3/2005 | Melton | ............ | F16B 45/00 248/304 |
| 2008/0283205 A1 * | 11/2008 | Zimmer | ............ | A47H 13/04 160/330 |
| 2010/0032536 A1 * | 2/2010 | Eagan | ............ | A47H 1/102 248/265 |
| 2015/0173548 A1 * | 6/2015 | Lin | ............ | A47H 1/144 248/251 |
| 2016/0157655 A1 * | 6/2016 | Muniz | ............ | A47H 1/122 362/253 |

\* cited by examiner

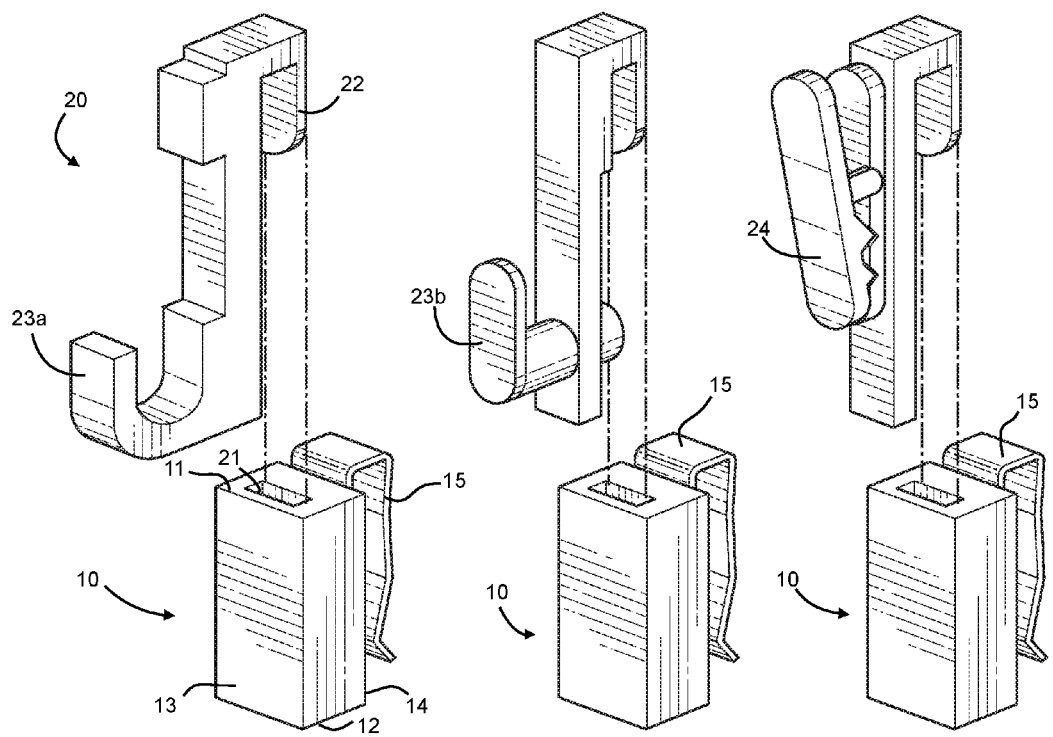

RETROFITTABLE SYSTEM AND APPARATUS FOR HANGING ARTICLES ON PRE-INSTALLED SUPPORTS

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to interior decorating and, more particularly, to systems and apparatuses for personalizing window treatments while avoiding altering existing supports and structures.

BACKGROUND

Conventional slat blinds, whether oriented horizontally or vertically, are commonly supplied as window treatments in housing rentals. Because landlords and rental managers tend to advertise their spaces to a wide variety of potential tenants likely having conflicting tastes and sensibilities in terms of design and aesthetics, these window treatments tend to be defined by generic white, cream, or off-white coloring and few, if any, embellishments. Though inoffensive, such generic window dressings may be bland and unappealing to inhabitants hoping to personalize their living space.

Some rental agreements expressly prohibit removal or modification of pre-installed fixtures such as window treatments, limiting tenants' opportunities for personalization. Still others prohibit adding holes, such as those needed to secure some fixtures, to the walls. Some dwellings themselves comprise materials that are not capable of accommodating certain types of fixtures. For example, it may be impractical to bore holes for fixtures into a brick wall. Even those rental agreements that do allow inhabitants to modify or remove features exiting in the rented space fail to solve the problem. Though some renters may choose to remove window dressings, including any brackets and valances secured to the window frame and/or surrounding walls and secure their own brackets, valances, and other fixtures others may be discouraged from so doing by lacking the proper tools, having mobility problems, or being unable to replace and/or store the fixtures on their own.

Some proposals for enabling personalization of window dressings in spite of restrictions have been suggested. For instance, U.S. Pat. No. 5,673,741 to Cairns suggests making easily replaceable window treatments using opposing hook and loop fasteners to secure a drapery to an outer frame. Unfortunately, this reference is deficient because the permanent or semi-permanent attachment surfaces contemplated fail to optionally permit sliding the window treatment, such as a curtain, open and closed depending on desire for light and a view through the window. As another example, U.S. Pat. No. 6,334,477 to Moir discloses an adapter for mounting a curtain on the same sliding track along with vertically-hanging blinds. This, however, is deficient for failing to retrofit other types of conventional window treatments, such as horizontal blinds, with curtains. As still another example, U.S. Pub. No. 2012/0241106 filed by Bolton et al. describes a method of forming curtains to replace vertical slats in a generic mounted valance. This proposal is deficient, however, because its application is only suited to limited types of window treatments and thus fails to conveniently solve the problem as relates to the variety of different conventional window treatments disposed, especially in rental properties, and even variety of desirable curtains, dressings, and other articles.

Thus, there remains a need for a system and device that easily enables personalization of window treatments by hanging curtains or other articles while avoiding alteration of the pre-installed fixtures, supports, and surrounding surfaces.

SUMMARY

The disclosure is directed to systems and related apparatuses for hanging articles on pre-installed supports and may comprise a plurality of devices formed to secure articles such as drapery and curtains to pre-installed headrails, brackets and other supports comprising conventional window treatments.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the device may comprise a body portion including mechanical means for anchoring the body portion against a pre-installed support. More particularly, the body portion, or simply the body for the sake of brevity, may have a top end, a bottom end, a front side, and a back side, and the means for anchoring the body along its back side against the pre-installed support. One skilled in the art will recognize that the means for anchoring may take a variety of mechanical forms and, further, that providing a means for mechanically anchoring the body, rather than chemically as an example, may ensure that such means may be capable of reuse in conjunction with different, or even the same, pre-installed supports.

In an embodiment, the mechanical means for anchoring may comprise a hook operative to hang the body from a top side or edge of the pre-installed support so that it may hang with its back side against a front facing portion of the pre-installed support. As another example, a resilient clip may be provided to forcibly compress the pre-installed support against the back side of the body. As yet another example, the body may define a channel or series of holes configured to receive a rugged strap, such as a zip-tie, operative to lash the body against the pre-installed support. The foregoing are of course offered by way of example only and not of limitation. Indeed, depending on the particular configuration of the mechanical means for anchoring, the body may be maintained securely or even slidably against the pre-installed support, depending, for example, on a user's particular aesthetic and/or practical needs. In one embodiment, for instance, the pre-installed support may be a head rail or even a valance portion of a conventional window treatment, which will be familiar to those skilled in the art. In such cases, the mechanical means for anchoring may be selected to wrap around at least a top portion of the head rail or valance so that the body may be secured against a front-facing portion of the head rail or valance. It is contemplated that this arrangement would enable any articles, such as curtains, coupled to the head rail or valance by way of the device to be placed in front of a window and any slat blinds in order to desirably decorate an interior of a room.

A linking member may then be disposed along the bottom end of the front side of the body, or alternatively extend forward from such front side, to join an article to the pre-installed support.

Like the mechanical means for anchoring, the linking member may take various forms to accommodate the unique needs of a particular user. For instance, any articles intended for hanging may be a curtain, as mentioned above. Curtains may comprise a heading, or top edge, defining a channel for receiving a curtain rod. Some curtains may instead define a series of button holes arranged along the heading to receive hooks, hoops, or other devices that enable hanging the curtain from a rod. Still other curtains may comprise a straight upper edge free of embellishment or hanging aids. As such, the linking member may be variously formed to join a variety of articles as may be desired by a user.

In accordance with one embodiment, the linking member may be formed as a hook to support a cylindrical rod received through a curtain heading. In another embodiment, the linking member may be a clip operative to resiliently grip a heading portion of a curtain. In still another embodiment, a linking member may define one or more holes operative to receive nails or even screws to support additional brackets configured to support an article. In this particular embodiment, it is contemplated that hardware typically known to alter and/or damage supports and surfaces may be used while avoiding so doing.

It is contemplated that a plurality of devices formed according to the disclosure may be disposed along a support to support desired articles at intervals. This may have the effect of distributing the weight of any articles joined to the support across the length of the support, though the number and interval placement of each device may vary.

In some embodiments, the body and linking member of each device comprise optionally separable parts that are securably and interchangeably mateable with one another. For example, a user may choose to pair a particular form of linking member, such as a hook, with a body having a zip-tie as the mechanical means for anchoring the body to the pre-installed support. It may become apparent that an alternative type of linking member, such as a clip may better serve the article being joined, however, thus a user may replace the hook with a clip to forcibly grab the article, joining it to the support.

Thus, it is an object of the invention to enable attachment of articles such as curtains to existing structures, avoiding invasive reconstruction of such areas. By being able to attach the clips and hooks, for example, to an existing structure, it will be easier to alter and customize the appearance of pre-installed window treatments.

It is another object of the invention avoid altering pre-installed supports and surrounding surfaces over the course of customization.

It is still another object of the invention to avoid damaging fixtures and surfaces over the course of customization.

One or more of the above-disclosed embodiments, in addition to certain alternatives, are provided in further detail below with reference to the attached figures. The disclosed subject matter is not, however, limited to any particular embodiment disclosed.

BRIEF DESCRIPTION OF THE DRAWINGS

FIGS. 1-7 illustrate a plurality of exemplary embodiments of a retrofittable hanging apparatus.

Figure 4:
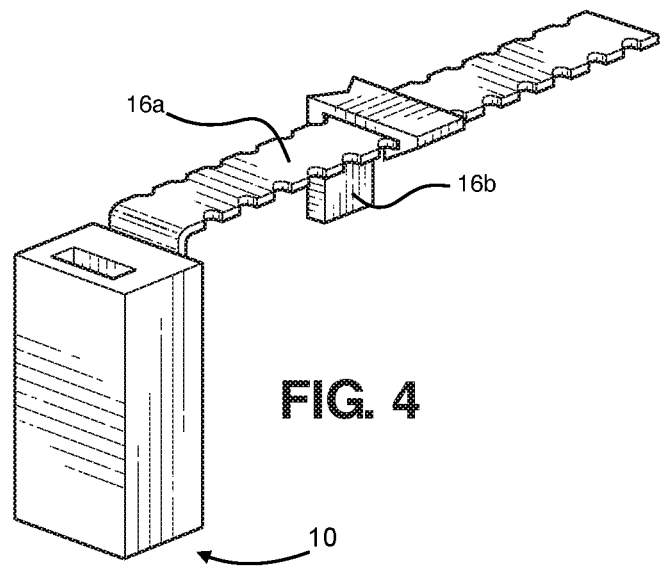

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

In the figures, a non-exhaustive variety of embodiments of devices for retrofitting conventional window treatments with curtains are shown in particular. Of course one skilled in the art will recognize that the limited embodiments are offered by way of example and not of limitation. Other articles may also be hung using the system and apparatus disclosed from other pre-installed supports.

Some embodiments of devices operative to hang articles on a pre-installed support are shown in FIGS. 1-3. With reference to FIG. 1, in particular it may be seen that each device may comprise a body 10 portion and a linking member 20. The body 10 may comprise a top end 11, a bottom end 12, a front side 13, and a back side 14, however, it is not necessary that each facet of the body 10 be flat, edged, or otherwise discrete. One skilled in the art will recognize that the body may instead comprise rounded features that blend into one another, thus, discussing the body 10 in terms of sides is meant to ease understanding of exemplary applications of the disclosure only, and not limit it. The body 10 may also include mechanical means for anchoring the back side 14 of the body against a pre-installed support. Such mechanical anchor may take a variety of forms, selected for example, depending on the type of pre-installed support. In FIGS. 1-3 and 5 the means for mechanically anchoring the body 10 is shown as a resilient clip 15 operative to forcibly maintain the body 10 against the pre-installed support.

Figure 8:
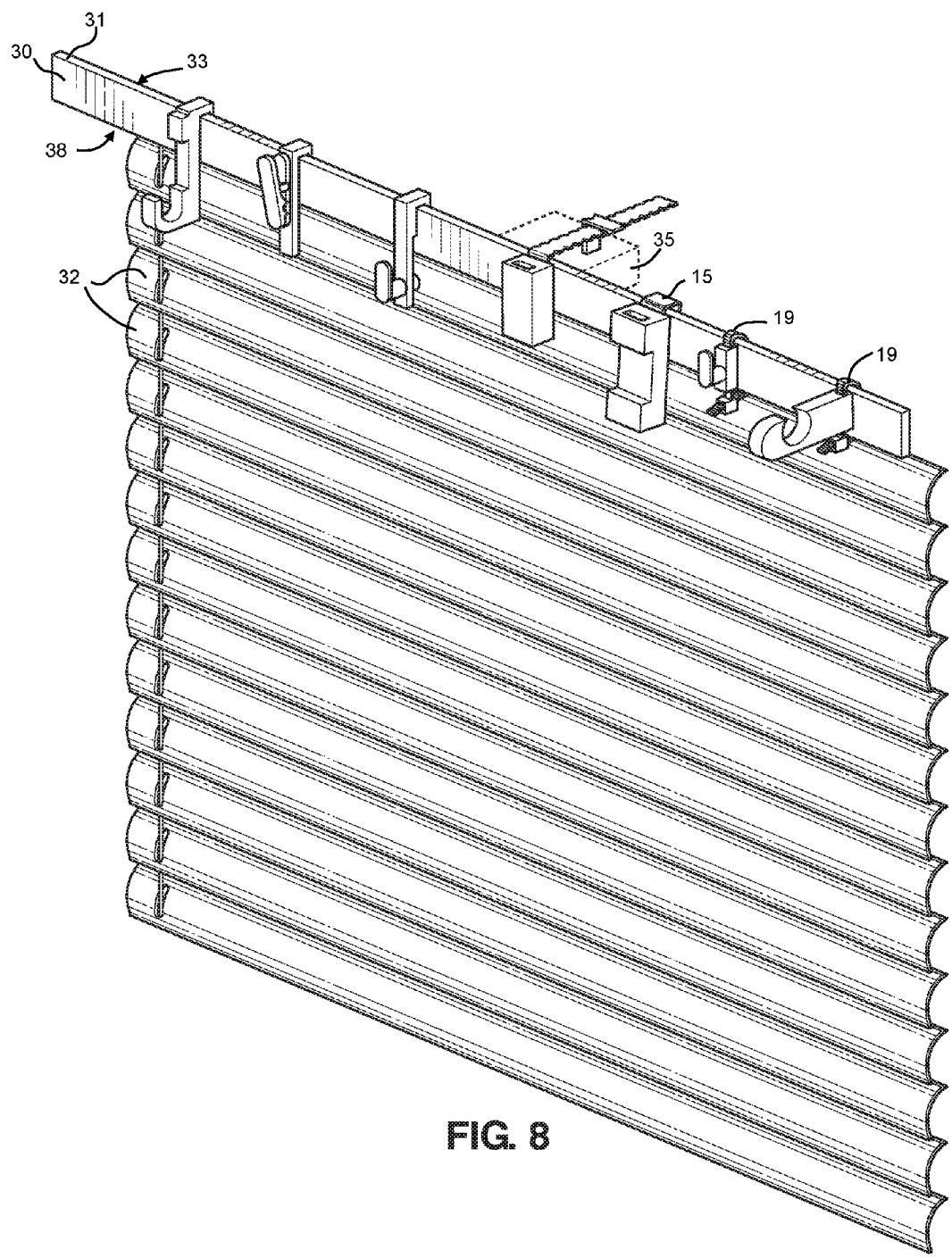
FIG. 8 shows the exemplary retrofittable hanging apparatuses of FIGS. 1-7 engaged on a pre-installed support.

This mechanical operation may be seen with reference to FIG. 8 for example. When an embodiment of the device is applied to head rail 30 or generic valance, for example, the clip 15 may be slipped over a top edge 31 or side of the head rail 30 to squeeze the body 10 against the head rail 30. In the figure, each of the various devices are shown to be maintained in a front-facing position toward an interior. Hanging an article, such as a curtain, from a device arranged in accordance with this exemplary orientation may ensure that the curtain may selectively obscure any blinds 32 or other generic fixtures while avoiding removal of such fixtures and while still being aesthetically visible in the interior of a space. Of course, other orientations are contemplated. Each device may be optionally or alternatively anchored along a back side 33 or even underside 38 of the head rail 30 or other pre-installed support without departing from the invention. With such alternative configurations in mind, it is also contemplated that means for linking be disposed on the top end or bottom end, or any other portion of the body 10 as may be desired. Indeed, such orientations and/or configurations may be desirable for effectively obscuring each device from view while in use, or enabling ease of anchoring the body, or even accessing the linking members and should not be seen to depart from the invention. The foregoing and illustrated embodiments are thus offered by way of example only and not of limitation.

Another embodiment of the mechanical means for anchoring the body 10 may comprise, for instance, an adjustable and securable ridged plank 16a and stopper 16b as shown in FIG. 4. As applied to the head rail 30 shown in FIG. 8 for example, this embodiment may accommodate supports of various width as demonstrated by dotted lines 35.

Figures 9, 9A:
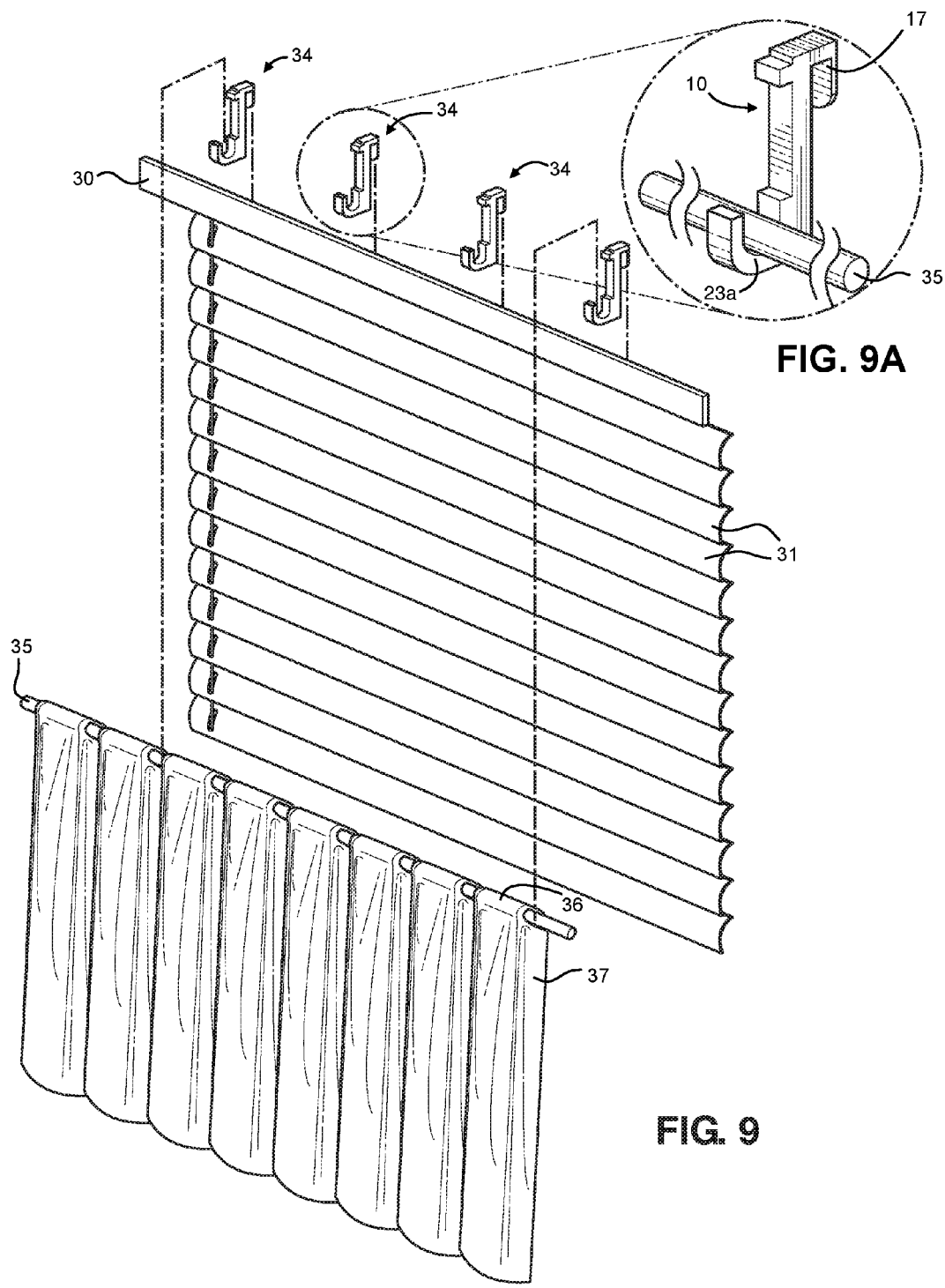
FIG. 9 illustrates one embodiment of a system for hanging articles on a pre-installed support.
FIG. 9A shows a blown-up view of one retrofittable hanging apparatus comprising an embodiment of the system for hanging articles on pre-installed supports from FIG. 9.

As may be better seen with reference to FIG. 9A, still another embodiment of mechanical means for anchoring the body 10 against the pre-installed support may comprise a fixed-width hook 17 sized to receive a particular width defining at least a portion of, for example, a head rail 30.

Figure 6:
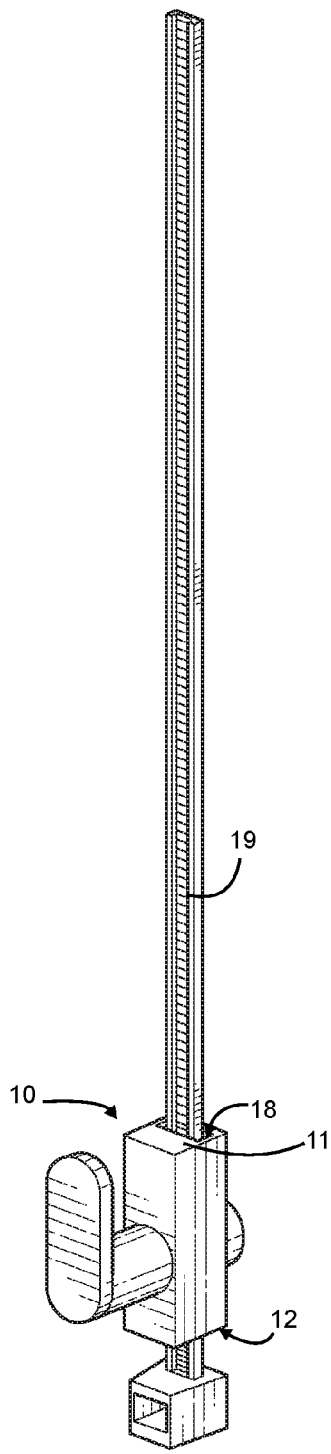
Figure 7:
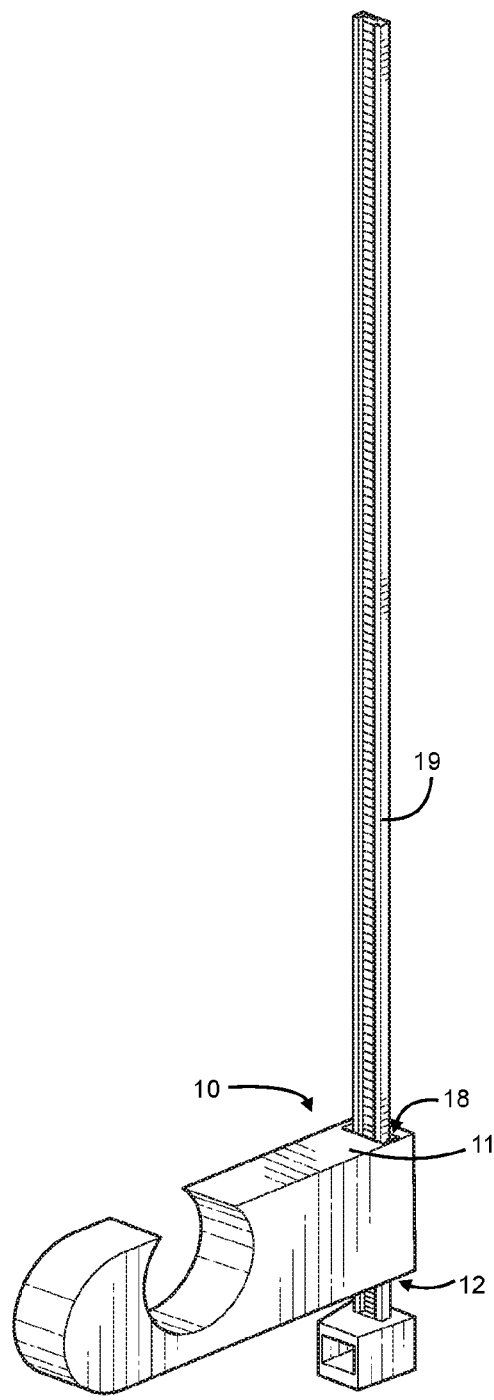

Finally, with reference to FIGS. 6 and 7, the body 10 portion of each device may be formed to define a channel 18 running from the top end 11 to the bottom end 12 of the body 10 configured to receive a rugged strap 19 as the mechanical means for anchoring the device, operative to lash the body 10 against the pre-installed support, as demonstrated in FIG. 8. The strap 19 may be a cable tie, zip tie, natural or synthetic cord, or any other length of material capable of securing an embodiment of the body 10 against a pre-installed support. In some embodiments, it is contemplated that the body portion may be formed to define a ridge or grove along the length of the body to externally receive the rugged strap as a means for anchoring the body against a pre-installed support.

Figure 5:
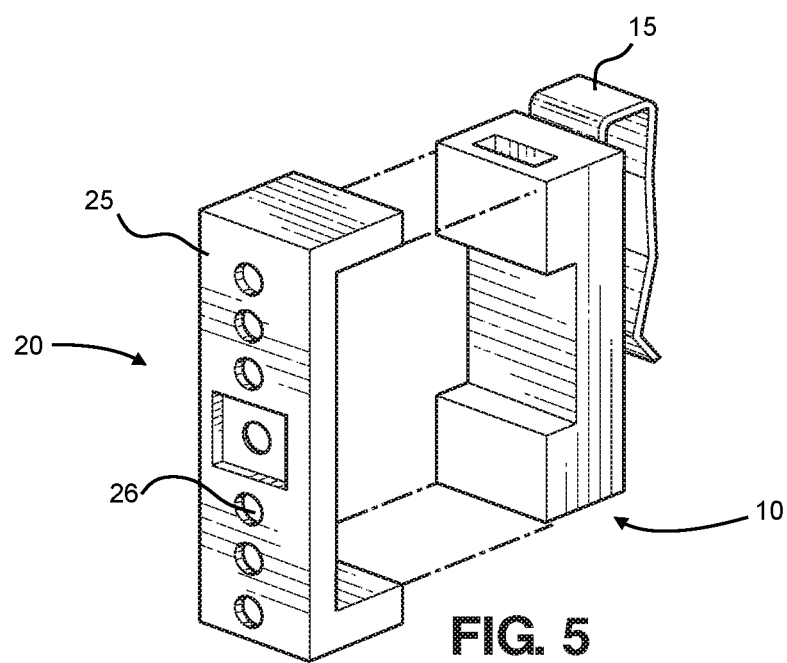

Returning reference to FIG. 1, a linking member 20 may be disposed along the front side 11 of the body 10 and be operative to removably join one or more articles along the pre-installed support. As illustrated, an embodiment of the device may comprise a body 10 and linking member 20 that are optionally separable from one another. For instance, the body 10 may comprise a cavity 21 or hollow sized to mateably receive an insert 22 or other complementary portion formed in the linking member 20. Similarly, the body 10 and linking member 20 shown in FIG. 5 are illustrated as complementary snap-fit pieces. In any of these exemplary cases, as well as others that will be apparent to those skilled in the art, variously formed linking members 20 may be interchangeable with variously formed bodies 10 to enable retrofitting a wide variety of pre-installed supports with, similarly, a wide variety of desirable articles. Still, it is contemplated that the device may comprise a body 10, mechanical means for anchoring, and even linking member 20 formed as a single, integrated piece, such as any of those illustrated in FIGS. 6, 7, and 9A. One skilled in the art will recognize that providing separable or integrated parts will not depart from the invention.

With reference to FIGS. 1-3, the linking member 20 may, for example, be formed as any of a groove 23a, hook 23b, and clip 24 disposed along the front side of the body 10 and operative to removably join a portion of an article, such as a curtain along a pre-installed support. This may be better understood with reference to FIGS. 9 and 9A, for example. There, a plurality of similarly-formed devices 34 for retrofitting a pre-installed support are shown to be disposable along the length of a conventional head rail 30 supporting horizontally-oriented slat blinds 31. The linking member may be a hook 23b configured to support an elongated curtain rod 35. A heading portion 36 of a curtain 37 may be configured to receive the rod 35, which may then be placed in each of the hooks 23b comprising the devices 34 anchored to the head rail 30 at intervals. Placing the devices 34 at intervals may ensure that the weight of the curtain 37 or other articles is distributed across the length of the head rail 30 or support. Thus, a curtain 37 may be hung from a pre-installed support while avoiding any need to alter or remove the structure, or alter or damage any surrounding surface.

One skilled in the art will recognize that any type of curtain rod 35 may be sufficient to practice the invention and should not be seen to limit the invention. Indeed, the invention may be practiced without a rod 35 at all. Using clips 24 such as those in FIG. 3 as the linking member 20 may permit a user to directly link a curtain or other article to the pre-installed support, avoiding any need for intermediaries such as rods. Stoppers and friction-enhancing materials may be applied or otherwise comprise portions of the invention to prevent slippage across the support.

Some may prefer to disguise the retrofittable device with decorative brackets and other hardware. In such cases, the linking member 20 may comprise a rigid panel 25, shown in FIG. 5, defined by one or more holes 26 operative to receive screws, nails, or other means of attachment.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, types and combinations of materials selected to comprise any or all of the parts of the system and apparatus may vary depending on, for example, cost efficiency and even aesthetic preferences of the user. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the retrofittable system and apparatus for hanging articles on pre-installed supports with which that terminology is associated. In general, the terms used in the following claims should not be constructed to limit the retrofittable system and apparatus for hanging articles on pre-installed supports to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the retrofittable system and apparatus for hanging articles on pre-installed supports is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the retrofittable system and apparatus for hanging articles on pre-installed supports.

What is claimed is:

1. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support and wherein the at least one mechanical means for anchoring is at least one clip;
   c) at least one linking member, the at least one linking member comprising:
      i) a linking member rear side;
      ii) an extension disposed along the linking member rear side, wherein the extension is configured to extend into the at least one body portion hollow; and
      iii) a linking member front side, wherein the linking member front side has at least one support portion, and wherein the at least one support portion is configured to removably retain at least one article.

2. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support and wherein the mechanical means for anchoring is at least one combination, the combination comprising at least one ridged plank and at least one stopper;
   c) at least one linking member, the at least one linking member comprising:
      i) a linking member rear side;
      ii) an extension disposed along the linking member rear side, wherein the extension is configured to extend into the at least one body portion hollow; and
      iii) a linking member front side, wherein the linking member front side has at least one support portion, and wherein the at least one support portion is configured to removably retain at least one article.

3. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support;
   c) at least one linking member, the at least one linking member comprising:
      i) a linking member rear side;
      ii) an extension disposed along the linking member rear side, wherein the extension is configured to extend into the at least one body portion hollow; and
      iii) a linking member front side, wherein the linking member front side has at least one support portion, and wherein the at least one support portion is configured as a protrusion having at least one groove to removably retain at least one article.

4. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support;
   c) at least one linking member, the at least one linking member comprising:
      i) a linking member rear side;
      ii) an extension disposed along the linking member rear side, wherein the extension is configured to extend into the at least one body portion hollow; and iii) a linking member front side, wherein the linking member front side has at least one support portion, and wherein the at least one support portion is configured as a protrusion having at least one hook configured to removably retain at least one article.

5. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support;
   c) at least one linking member, the at least one linking member comprising:
      i) a linking member rear side;
      ii) an extension disposed along the linking member rear side, wherein the extension is configured to extend into the at least one body portion hollow; and
      iii) a linking member front side, wherein the linking member front side has at least one support portion, and wherein the at least one support portion is configured as a protrusion having at least one clip to removably retain at least one article.

6. A device for attachment to a pre-installed support, comprising:
   a) at least one body portion, wherein the at least one body portion defines at least one body portion hollow, the hollow having only one opening;
   b) at least one mechanical means for anchoring disposed on the at least one body portion, wherein the at least one mechanical means for anchoring is configured to attach to at least one pre-installed support;
   c) at least one linking member, the at least one linking member comprising:
      i) a linking member rear side;
      ii) an extension disposed along the linking member rear side, wherein the extension is configured to extend into the at least one body portion hollow; and
      iii) a linking member front side, wherein the linking member front side has at least one support portion, and wherein the at least one support portion is configured as a protrusion defining at least one aperture, wherein the at least one aperture is sized to allow a curtain rod to pass through the at least one aperture.

7. A device for attachment to a pre-installed support, comprising: a body portion, comprising:
   a) at least one central portion, wherein the at least one central portion defines at least one central portion channel, and wherein the at least one central portion channel has at least two openings;
   b) a rear side; and
   c) a front side, the front side having at least one support portion, wherein the at least one support portion is configured to removably retain at least one article; and at least one mechanical means for anchoring, wherein the at least one mechanical means for anchoring is configured to pass through the at least one central portion channel and secure the device to at least one pre-installed support.

8. The device of claim 7, wherein the at least one mechanical means for anchoring is at least one zip tie.

9. The device of claim 7, wherein the at least one support portion is configured as a protrusion having at least one groove.

10. The device of claim 7, wherein the at least one support portion is configured as a protrusion having at least one hook.

11. The device of claim 7, wherein the at least one support portion is configured as a protrusion having at least one clip.

12. The device of claim 7, wherein the at least one support portion is configured as a protrusion defining at least one aperture, wherein the at least one aperture is sized to allow at least one curtain rod to pass through the at least one aperture.

13. The device of claim 7, wherein the at least one support portion defines at least one hole, the at least one hole configured to removably receive at least one threaded attachment means.

14. The device of claim 7, wherein the at least one mechanical means for anchoring comprises:
   a) at least one fixed-width hook element having at least one long side and at least one short side, the at least one fixed-width hook element having at least one short side channel in its at least one short side; and
   b) at least one means of attachment, wherein the at least one means of attachment is configured to pass through the at least one short side channel and the at least one central portion channel and removably secure the at least one fixed-width hook element to the body portion.

* * * * *